United States Patent [19]
Terry

[11] Patent Number: 5,864,713
[45] Date of Patent: Jan. 26, 1999

[54] METHOD FOR DETERMINING IF DATA SHOULD BE WRITTEN AT THE BEGINNING OF A BUFFER DEPENDING ON SPACE AVAILABLE AFTER UNREAD DATA IN THE BUFFER

[75] Inventor: Donn Terry, Fort Collins, Colo.

[73] Assignee: Hewlett-Packard Company, Palo Alto, Calif.

[21] Appl. No.: 598,582

[22] Filed: Feb. 12, 1996

[51] Int. Cl.[6] .............................. G06F 13/00; G06F 13/14
[52] U.S. Cl. ......................... 395/872; 395/877; 711/111; 711/154; 711/159
[58] Field of Search ..................................... 345/250, 116, 345/118; 370/463, 412; 395/872, 877; 711/111, 154, 159, 145, 123; 707/1

[56] References Cited

U.S. PATENT DOCUMENTS

| | | | |
|---|---|---|---|
| 5,121,114 | 6/1992 | Nagasawa et al. ...................... | 345/118 |
| 5,159,681 | 10/1992 | Beck et al. ............................... | 395/116 |
| 5,210,749 | 5/1993 | Firoozmand ............................. | 370/463 |
| 5,404,511 | 4/1995 | Notarianni ................................ | 707/1 |
| 5,426,639 | 6/1995 | Folletet et al. ........................... | 370/412 |
| 5,444,853 | 8/1995 | Lentz ....................................... | 711/123 |
| 5,636,360 | 6/1997 | Courts et al. ............................ | 711/145 |

*Primary Examiner*—Le Hien Luu
*Attorney, Agent, or Firm*—Augustus W. Winfield

[57] ABSTRACT

A buffer, implemented in computer memory, that never wraps data around from the buffer end to the buffer beginning unless the amount of data being transferred exceeds the entire size of the buffer. Eliminating wrapping improves performance by eliminating the need for the reading device to reconstruct a contiguous block of data from multiple reads. In addition, when possible, only the beginning portion of the buffer is used, thereby minimizing the occurrence of virtual memory page faults during buffer use and increasing the probability that pages near the end of the buffer will be freed for uninterrupted use by other processes. In addition to the usual read and write pointers, the buffer in the invention adds two variables, a buffer end pointer and a marker. When necessary, the buffer end pointer indicates the end of a block of data. The marker is used to limit the use of the buffer memory to a few pages at the beginning of the buffer when possible. If a block of data is written past the marker, the next block of data is written at the beginning of the buffer.

5 Claims, 5 Drawing Sheets

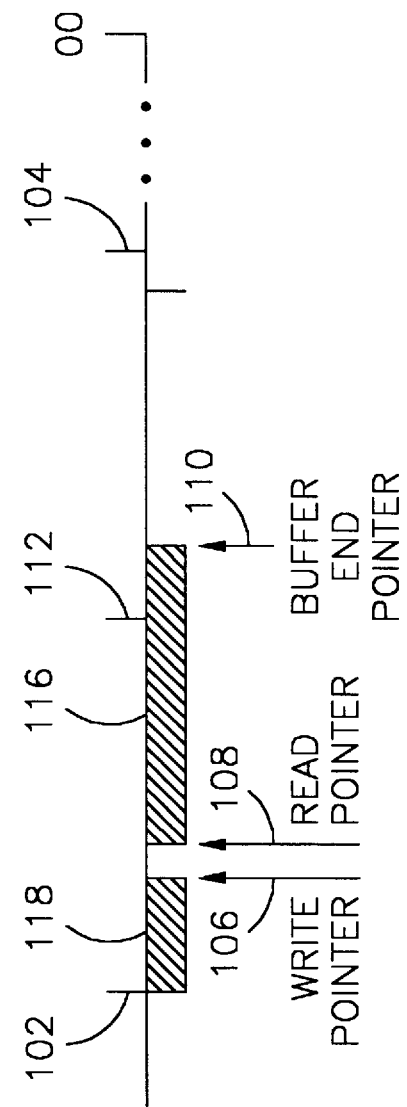

METHOD FOR DETERMINING IF DATA SHOULD BE WRITTEN AT THE BEGINNING OF A BUFFER DEPENDING ON SPACE AVAILABLE AFTER UNREAD DATA IN THE BUFFER

FIELD OF INVENTION

This invention relates generally to computer input/output systems and more specifically to a process of managing a data buffer in memory.

BACKGROUND OF THE INVENTION

A data buffer is a software procedure or a hardware device used to compensate for a difference in rate of flow of data or a difference in time of occurrence of data transfer events. For example, a computer may need to write data to a disk drive. The computer transfer rate may be higher than that of the disk drive, or the disk drive may need to wait until electro-mechanical events have occurred such as positioning a head over the proper track and sector. Similarly, a data buffer may be used for data transfer between independent processes within a computer or between computers. A data buffer may be a separate physical hardware device or a data buffer may simply be an area of storage that is temporarily reserved for use in performing data transfer.

In general, in an operating system, many processes share main memory. It is expensive to dedicate large blocks of main memory to each process. Instead, in many computer systems, virtual addressing is used in which virtual addresses are translated by a combination of hardware and software into addresses that at any given time might map to peripheral devices such as disks or to addresses that access main memory. One strategy for remapping virtual addresses from the main memory to a disk or other peripheral devices is on a "least recently used" basis. That is, if a process has recently used a block of virtual addresses assigned to main memory, the virtual addresses will remain mapped to main memory. If the addresses are not used, the content of the main memory area may be written to disk, freeing the main memory for use by other processes, possibly at a different virtual address. A processor may then reference a virtual address corresponding to a page that is on a disk (page fault), requiring a page to be moved from the disk into main memory. In general, page faults have a substantial negative impact on performance.

A common data structure for a buffer is a ring, implemented in an area of memory that is shared by both a writing device or process and a reading device or process. In a typical implementation, there is a beginning address, an end address, a write pointer and a read pointer. Initially, the write pointer and the read pointer are at the beginning address. A writing device writes into the ring buffer, moving the write pointer to the end of the newly written data. A reading device reads data at the read pointer, moving the read pointer as data is read. When the write pointer reaches the end address of the ring, the write pointer is moved ("wrapped around") to the beginning address. Various safeguards are implemented to ensure that the write pointer can never overlap the read pointer.

There are two aspects of the typical ring buffer just described that can negatively affect performance. The first performance loss results from the fact that data can be wrapped around from the end address to the beginning address, but may need to be sent or read as a contiguous block. The writer may be required to write two separate blocks. Similarly, the reading device may be forced to perform two separate read operations, one from the beginning address of the data block to the end address of the buffer and another from the beginning address of the buffer to the end address of the data block. In addition, the reading device must then reconstruct a contiguous block of data, perhaps requiring copy operations to place the two sets of data into contiguous memory or allocation of temporary memory. The second performance loss results from virtual memory page faults. If a ring buffer is implemented in virtual memory, the buffer is repeatedly using new areas of the buffer that may not have been used recently. Therefore, there is a high probability of encountering page faults. There is a need for a buffer having improved performance by reducing wrap arounds and page faults.

SUMMARY OF THE INVENTION

A buffer is provided that improves performance by reducing memory page faults and by reducing the need for reading devices to reconstruct contiguous blocks of data. For short blocks of data, the buffer frequently reuses the beginning part of the buffer, when possible. However, the buffer accommodates long blocks of data when necessary. Frequent reuse of the beginning part of the buffer improves buffer performance for short blocks of data by minimizing the occurrence of page faults during buffer use and improves system performance by increasing the probability that memory pages towards the end of the buffer will be freed for uninterrupted use by other processes. In addition, the buffer never wraps blocks of data around from the buffer end to the buffer beginning unless the amount of data being transferred exceeds the entire size of the buffer. Eliminating wrapping improves buffer performance by eliminating the need for reading devices to reconstruct contiguous blocks of data from multiple reads.

In addition to common buffer read and write pointers, the buffer in the invention adds a third pointer and a marker. The third pointer, a buffer end pointer, is used when necessary to indicate the end of a block of data. The marker is used to limit the use of the buffer memory to a few pages at the beginning of the buffer, when possible.

BRIEF DESCRIPTION OF THE DRAWINGS

FIG. 1C is the block diagram of FIG. 1A with two blocks of unread data in the buffer.

DETAILED DESCRIPTION OF THE PREFERRED EMBODIMENT OF THE INVENTION

Figure 1A:
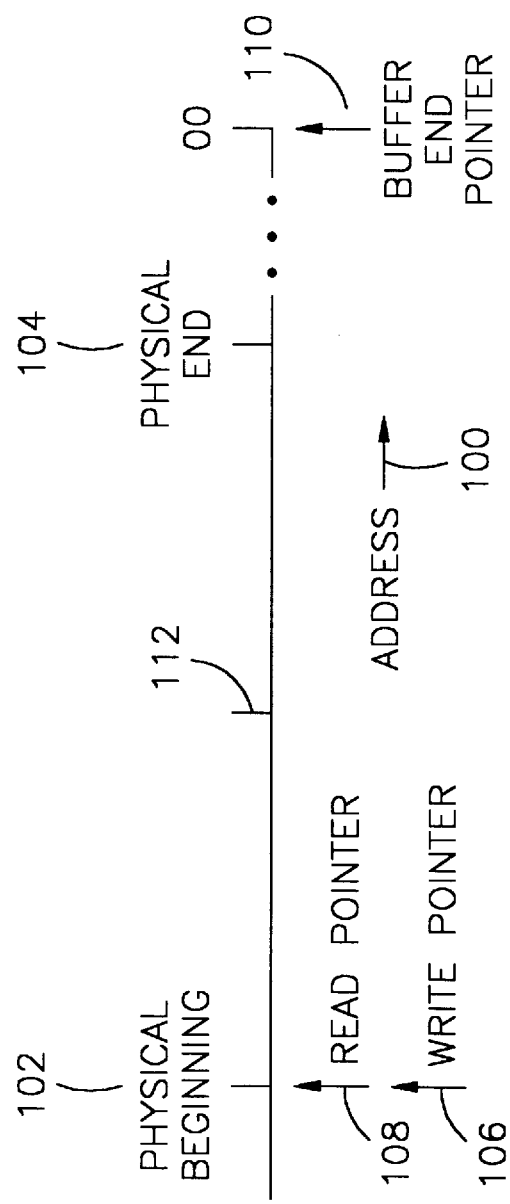
FIG. 1A is a bock diagram of an area of memory used for a data buffer in accordance with the invention.

FIG. 1A illustrates an area of memory for use as a buffer in accordance with the invention. Addresses progress from left to right as indicated by arrow 100. The buffer has a physical beginning address (reference number 102) and a physical end address (reference number 104). For purposes of the invention, the physical beginning 102 and the physical end 104 are constants. There is a write pointer 106 and a read pointer 108. The write pointer 106 is controlled by a writing device (not illustrated). The read pointer 108 is controlled by a reading device (not illustrated). Initially, the write pointer 106 and the read pointer 108 both point to the physical beginning 102. A buffer end pointer 110 and a marker 112 are unique to the invention. Both are discussed in more detail below after additional introductory material. As illustrated in FIG. 1A, the buffer end pointer 110 is initially set to a value of "infinity" (or the highest possible address). The value "infinity" for the buffer end pointer 110 is used as a flag to indicate several conditions as discussed in detail below.

Before discussing FIGS. 1B and 1C, some operational rules for the buffer of the invention need to be specified, as follows:

1. If a block of data to be written is longer than the memory available between the physical beginning 102 and physical end 104 the block of data to be written is broken into blocks of the buffer total size (physical end minus physical beginning) or smaller.
2. Writing of a block of data is initiated only if there is sufficient contiguous free memory after the address pointed to by the write pointer 106 to hold the entire block to be written.
3. If, after writing a block of data, the writer software determines that the write pointer 106 is beyond the marker 112, the writer writes the next block of data starting at the physical beginning 102.
4. Only the writer can change the write pointer 106.
5. Only the reader can change the read pointer 108.
6. The writer can change the buffer end pointer 110 only when it has a value of infinity (largest possible address).
7. The reader can change the buffer end pointer 110 only when it does not have a value of infinity (largest possible address).

Figure 1B:
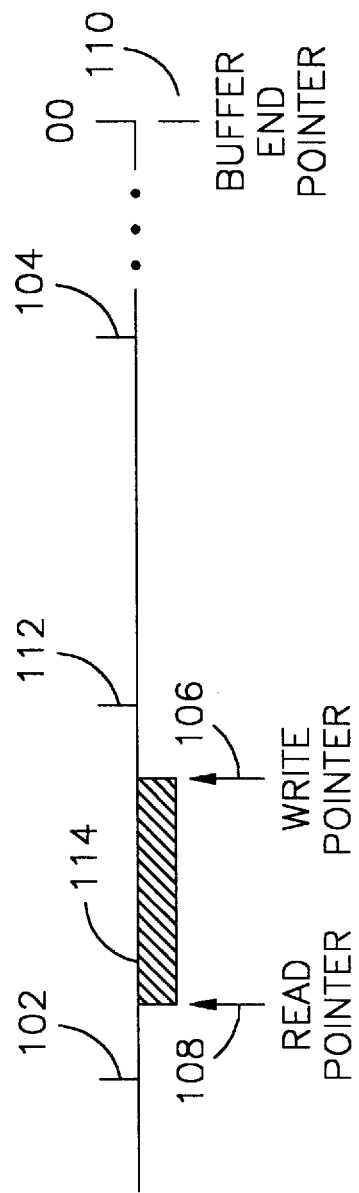
FIG. 1B is the block diagram of FIG. 1A with unread data in the buffer.

FIG. 1B illustrates the buffer (memory area) of FIG. 1A with an unread data block 114. In FIG. 1B, data block 114 is being written by the writing device (or the writing device has completed writing) at the address indicated by the write pointer 106. The write pointer 106 marks the end of data block 114. A reading device is reading data block 114 at the address indicated by the read pointer 108. The reading device has already read the data between the physical beginning 102 and the read pointer 108.

Referring to FIG. 1B, the buffer could continue to write new blocks of data between the write pointer 106 and the physical end 104. However, there are two potential risks. First, requesting access into addresses beyond the write pointer 106 that have not been recently used will likely result in page faults. Second, not using the addresses at the beginning of the buffer for a while will likely result in the addresses at the beginning of the buffer to be paged out to disk, resulting in a later page fault for a write starting at the physical beginning 102. Therefore, overall performance may be improved by using only the part of the buffer near the physical beginning 102, even if occasionally a write process must wait for reading to finish before starting to write a new block of data. The inventor has observed that for short blocks of data, a short buffer has higher performance than a long buffer because of the virtual memory page fault problem. However, if there are occasional long blocks of data, a short buffer may have performance problems because of the need to break up and reconstruct contiguous blocks of data. The buffer of the invention keeps the buffer short for short blocks of data (marker 112 is relatively near the beginning) but permits occasional long blocks to be written as contiguous blocks (memory between pointers 102 and 104 is relatively large).

Marker 112 is used as a "soft" limit on the number of memory pages used. It is not a hard maximum, but rather a marker for use by the writer software. As stated in Rule 3, if after writing a block of data, the writer software determines that the write pointer 106 is beyond the marker 112, the writer writes the next block of data starting at the physical beginning 102. As a result, the buffer repeatedly uses the memory pages between the physical beginning 102 and the marker 112, reducing the probability of a page fault for that part of the buffer. In addition, infrequently used pages near the end of the buffer will likely be freed for uninterrupted use by other processes. However, when necessary, the buffer accommodates longer blocks that extend beyond the marker. Note that the optimal position of the marker within the buffer is system dependent, and must be empirically determined for optimal performance.

In contrast to typical ring buffers, another one of the goals of the buffer in the invention is to reduce the need for reading devices to reconstruct contiguous blocks of data. As stated in Rule 1, the buffer of the invention never writes data that wraps around from the physical end 104 to the physical beginning 102 unless the block of data to be written is larger than the entire buffer (that is, larger than the memory between the physical beginning 102 and the physical end 104). If the block of data to be written is larger than the entire buffer, the block is broken into smaller portions before the write operations are done.

Assume in FIG. 1B that the writing process is finished so that a new block of data may be written starting at the address indicated by the write pointer 106. In the invention, in the situation illustrated in FIG. 1B, if the new block of data to be written is larger than the memory available between the write pointer 106 and the physical end 104 then the write pointer is changed to point to the physical beginning 102. Simultaneously, the buffer end pointer 110 must be changed to indicate the end of data block 114. Writing then proceeds from the physical beginning 102, but only after the read pointer 108 has cleared sufficient space to write the new block of data. That is, writing is not initiated until there is sufficient empty space for the entire new block of data to be written (Rule 2). This may require the reading device to read all of block 114.

In FIG. 1C, an old data block 116 is being read at the read pointer 108 and the buffer end pointer 110 now points to the end of the old data block 114. A new data block 118 has being written and the write pointer 106 points to the end of the new data block 118. Since the old data block 116 ended beyond the marker 112, the new data block 118 starts at the physical beginning 102 (Rule 3). Given the situation depicted in FIG. 1C, there are four cases to be considered for writing a new block of data at the location indicated by the write pointer 106, as follows:

CASE 1: If the new block of data to be written will fit in the area between the write pointer 106 and the read pointer 108 then writing can be initiated immediately (note that data blocks can include length information so that the boundary between block 118 and the new block to be written can be determined).

CASE 2: If CASE 1 is not true, but the new block of data will fit in the area between the write pointer 106 and the buffer end pointer 110, writing must wait for the reading device to clear sufficient space (Rule 2).

CASE 3: If CASE 1 and 2 are not true, but the new block of data will fit in the area between the write pointer 106 and the physical end 104, the writer must wait for the reader to read all of the old data block 116. After reading the old block of data 116, the reader must change the read pointer 108 to point to the physical beginning 102 (Rule 5) and simultaneously, the reader must change the buffer end pointer 110 to point to infinity (Rule 7). Then, the writer can start writing the next block.

CASE 4: If the new block of data will not fit between the write pointer 106 and the physical end 104, then the new block must be written at the physical beginning 102. Therefore, the writer must wait for the reader to complete reading of old data block 116 and new data block 118. After the reader has completed reading the new data block 118 and the read pointer 108 is equal to the write pointer 106, the writer moves the write pointer 106 to point to the physical beginning 102 (Rule 4) and writing can start.

Note that by adding a third pointer (buffer end pointer 110) and a few simple rules that control when the third pointer can be changed, a buffer is provided that never wraps a block of data unless the block is larger than the entire buffer.

Figure 2:
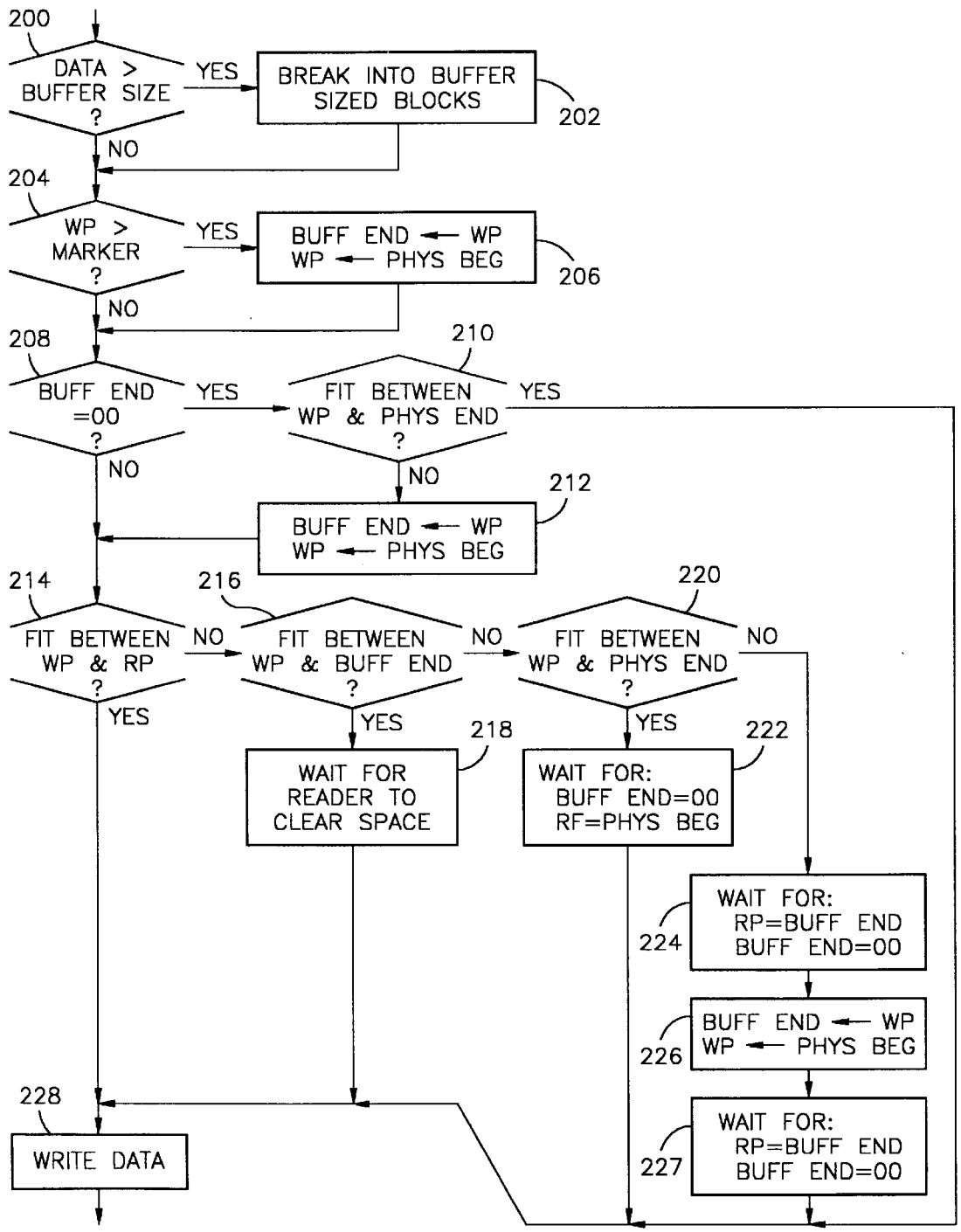
FIG. 2 is a flow chart of the method for a writer in accordance with the invention.

FIG. 2 is a flow chart for a writer as disclosed above. At the beginning of FIG. 2, the writer is ready to write a new block of data. If the new block of data is larger than the buffer (decision 200) then the new block is data is broken up into blocks that are the size of the buffer or smaller (box 202). If the address being pointed to by the write pointer is beyond the address pointed to by the marker (decision 204), then the buffer end pointer is changed to point to the address pointed to by the write pointer and the write pointer is changed to point to the physical beginning (box 206). If the buffer end pointer has a value of infinity (decision 208), the write pointer must be pointing to a higher memory address than the read pointer, as in FIG. 1B. If the new data block will fit between the address pointed to by the write pointer and the physical end (decision 210), then writing can proceed (box 228). If the write pointer has a value of infinity and the new data will not fit between the address pointed to by the write pointer and the physical end, then the writer must start at the physical beginning as in FIG. 1C. The buffer end pointer is changed to point to the address pointed to by the write pointer and the write pointer is changed to point to the physical beginning (box 212).

If the buffer end pointer has a value other than infinity, the situation is as illustrated in FIG. 1C. If the new data block will fit between the address pointed to by the write pointer and the address pointed to by the read pointer (decision 214), then writing can proceed (box 228). If the new data block will fit between the address pointed to by the write pointer and the buffer end pointer (decision 216) then the writer must wait for the reader to clear sufficient space to permit writing the entire block (box 218). If the new data block will fit between the address pointed to by the write pointer and the physical end (decision 220), then the writer must wait for the reader to read to the buffer end pointer, change the buffer end pointer to point to infinity and change the read pointer to point to the physical beginning (box 222). If the new data will not fit between the address pointed to by the write pointer and the physical end (decision 220), the writer first waits for the reader to finish reading data up to the address pointed to by the buffer end pointer, and then waits for the reader to change the buffer end pointer to infinity (box 224). The writer then changes the buffer end pointer to point to the address pointed to by the write pointer and the writer then changes the write pointer to point to the physical beginning (box 226). The writer still cannot write because there is still unread data. The writer then waits for the reader to continue reading data up to the address pointed to by the buffer end pointer and for the reader to change the buffer end pointer to infinity (block 227). Then, the writer can write the new block of data (box 228).

Figure 3:
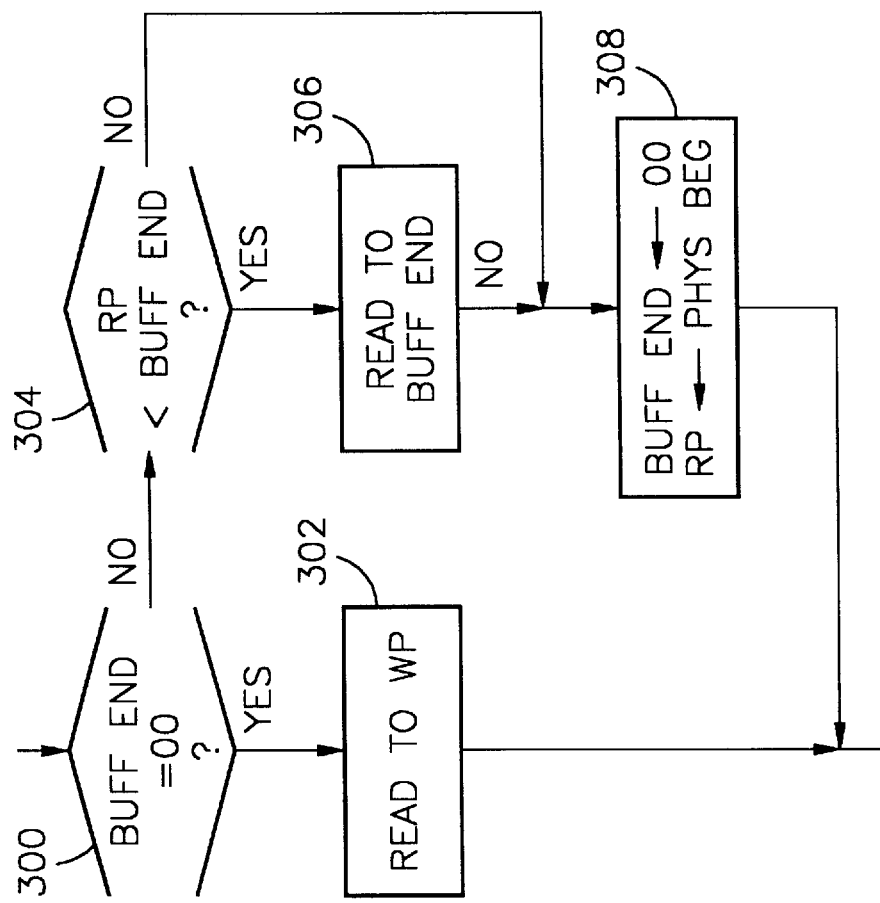
FIG. 3 is a flow chart of the method for a reader in accordance with the invention.

FIG. 3 is a flow chart for a reader as disclosed above. If the buffer end pointer has a value of infinity (decision 300), then the situation is as depicted in FIG. 1B and the reader can read data up to the write pointer (box 302). If the buffer end pointer has a value other than infinity, then the situation is as depicted in FIG. 1C. If the address pointed to by the read pointer is less than the address being pointed to by the buffer end pointer (decision 304), then the reader can proceed to read data to the buffer end pointer (box 306). If the address pointed to by the read pointer is equal to the address being pointed to by the buffer end pointer, then the reader changes the read pointer to point to the physical beginning and simultaneously changes the buffer end pointer to point to infinity (box 308).

There are several important details, as follows. Consider the writer during the transition from the situation depicted in FIG. 1B to the situation depicted in FIG. 1C. The writer must change the buffer end pointer 110 to point to the address pointed to by the write pointer 106 and change the write pointer 106 to point to the physical beginning 102. If either pointer is changed first and an interrupt occurs between the changes, the reader can misinterpret the state. Therefore, both pointers need to be changed in a single uninterruptable operation. The writer and reader are preferably asynchronous. Whenever the writer changes the write pointer to point to the beginning of the buffer, the writer must communicate this to the reader. Likewise, whenever the reader changes the read pointer to point to the beginning of the buffer, the reader must communicate this to the writer. In FIG. 2, box 218, the writer is waiting for the reader to clear space. The writer may optionally communicate to the reader that space is needed up to address "X" and the reader may optionally communicate when it has read past address "X".

Note that the buffer disclosed above partially behaves as a ring buffer in that the writer does not have to wait for the buffer to be emptied at the end before writing at the beginning. However, in contrast to a ring buffer, performance is improved because blocks of data are never wrapped from the end of the buffer to the beginning. In addition, the buffer disclosed above provides performance advantages by reducing the occurance of page faults, while at the same time permits the length to be arbitrarily large to accommodate long blocks of data when necessary.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of writing a block of data to a buffer, the method comprising the following steps:

(a) determining that unread data exists in the buffer;

(b) determining that there is available space in the buffer after the unread data but that the block of data cannot fit into the available space as a contiguous block after the existing data; and (c) writing the block of data as a contiguous block at a beginning of the buffer.

2. The method of claim 1, step (c) further comprising:

writing the block of data immediately when the block of data will fit between the beginning of the buffer and the unread data.

3. The method of claim 1, step (c) further comprising: p1 waiting for a reader to partially read the existing data before writing the block of data, when the block of data will partially overlap the existing data.

4. The method of claim 1, step (c) further comprising:

waiting for a reader to completely read the existing data before writing the block of data.

5. A method of writing a block of data to a buffer, the method comprising the following steps:

(a) determining that a write pointer is pointing to an address greater than a marker address;

(b) determining that there is available space in the buffer between an address indicated by the write pointer and a physical buffer end but that the block of data will not fit between the address indicated by the write pointer and the physical buffer end;

(c) changing the write pointer to point to a physical buffer beginning; and (d) writing the block of data at an address indicated by the write pointer.

\* \* \* \* \*